(12) United States Patent
Demharter et al.

(10) Patent No.: US 6,901,472 B2
(45) Date of Patent: May 31, 2005

(54) DATA-PROCESSING UNIT WITH A CIRCUIT ARRANGEMENT FOR CONNECTING A FIRST COMMUNICATIONS BUS WITH A SECOND COMMUNICATIONS BUS

(75) Inventors: Nikolaus Demharter, Oberottmarshausen (DE); Andreas Knoepfle, Dinkelscherben (DE)

(73) Assignee: Fujitsu Siemens Computers GmbH, Munich (DE)

( * ) Notice: Subject to any disclaimer, the term of this patent is extended or adjusted under 35 U.S.C. 154(b) by 556 days.

(21) Appl. No.: 09/835,138

(22) Filed: Apr. 16, 2001

(65) Prior Publication Data

US 2002/0013873 A1 Jan. 31, 2002

(30) Foreign Application Priority Data

Apr. 18, 2000 (DE) .......................... 100 19 239

(51) Int. Cl.[7] .............................................. G06F 13/38
(52) U.S. Cl. .................... 710/305; 710/309; 710/312
(58) Field of Search .............................. 710/305–307, 710/309–315, 104, 105–107, 110–112, 8–11, 16

(56) References Cited

U.S. PATENT DOCUMENTS

| | | | | |
|---|---|---|---|---|
| 5,572,706 A | * | 11/1996 | Matsumoto | 711/167 |
| 5,649,161 A | | 7/1997 | Andrade et al. | |
| 5,838,995 A | | 11/1998 | Chen et al. | |
| 5,978,859 A | * | 11/1999 | Sademaa | 710/3 |
| 6,070,215 A | * | 5/2000 | Deschepper et al. | 710/305 |
| 6,519,670 B1 | * | 2/2003 | Meiyappan | 710/305 |
| 6,529,980 B1 | * | 3/2003 | Abramson | 710/108 |

* cited by examiner

*Primary Examiner*—Paul R. Myers
*Assistant Examiner*—Raymond N Phan
(74) *Attorney, Agent, or Firm*—Cohen, Pontani, Lieberman & Pavane

(57) ABSTRACT

A data processing configuration with a first circuit configuration (1) that connects a first communication bus (2) with a second communication bus (3). The first circuit configuration (1) is the bus master of the first communication bus (2). Furthermore, a second circuit configuration (4) is connected with the first communication bus (2). By employing a wait signal (11), which is generated in the second circuit configuration (4) and transmitted to the first circuit configuration (1), it is possible to expand read and write access to the first communication bus (2) to any random number of clock cycles.

4 Claims, 3 Drawing Sheets

DATA-PROCESSING UNIT WITH A CIRCUIT ARRANGEMENT FOR CONNECTING A FIRST COMMUNICATIONS BUS WITH A SECOND COMMUNICATIONS BUS

BACKGROUND OF THE INVENTION (1) Field of the Invention

The present invention relates to a data processing configuration with a circuit configuration that connects a first communication bus with a second communication bus, wherein a second circuit configuration is also connected with the first communication bus, (2) Description of Related Art Data processing devices comprise various units such as the CPU (central processing unit), memory, display, hard disk controller etc., which are connected with each other through communication buses and exchange data. Often several different communication buses are arranged in a data processing device, which differ from each other in their transmission speed, bus architecture, universality and/or specialization.

In order to connect a first communication bus with a second communication bus, a so-called bridge is generally used. The bridge can serve e.g. as bus master for one of the communication buses. This means that the bridge allocates read and write rights on the bus to the remaining components of this communication bus that are connected.

For example, based on the specific protocol of a communication bus, read and write access is always set for the duration of two clock pulses of a timing signal. In the first clock pulse, the address and cycle information is made available, while in the second clock pulse data is transmitted, with the address and cycle information remaining stable. Problems arise from this rigid bus protocol when the data is not made available by the component that is connected to the communication bus within two clock cycles. A solution to this problem has so far been enabled by connecting the non-bus conforming module to another bus. This solution, however, requires additional development efforts because in this case a special interface must be developed for each module. Another possibility to solve this problem consists of modifying the bridge in such a way that in dependence on the selected address a previously established number of clock cycles is allowed to pass until the data is read. The disadvantage here is first the fact that the number of clock cycles that have be allowed to pass is fixed and cannot be adjusted to changing circumstances. The second disadvantage is the fact that the bridge must be adjusted separately to each peripheral module, which limits the re-use of the bridge drastically.

BRIEF SUMMARY OF THE INVENTION

One object of the invention is to provide a data processing device with a communication bus and a method for operating the bus, wherein a circuit configuration can be connected to the communication bus that makes the data available after any random period of time.

These and other objects of the invention are achieved by a data processing device with:
a first circuit configuration that connects a first communication bus with a second communication bus and is the bus master of the first communication bus;
a second circuit configuration that is connected with the first communication bus;
wherein the second circuit configuration has a first output port that is connected with an input port of the first circuit configuration.

The invented configuration contains a bridge that connects a first communication bus with a second communication bus. Additional modules can be connected to the first communication bus, while also enabling the connection of such modules that do not operate in a conforming manner with the first communication bus. This is accomplished by transmitting a signal from a first output port of the second circuit configuration to an input port of the first circuit configuration. This signal is for example a wait signal. The first circuit configuration (bridge), which operates e.g. as bus master, can thus be placed into a condition in which it waits a random number of clock cycles for the data from the second circuit configuration. One advantage of this configuration is e.g. that now not only communication bus conforming modules that do not require a wait signal but also communication bus non-conforming modules, which additionally transmit a wait signal to the bridge, can be connected to the first communication bus.

A variation of the invented configuration provides for the arrangement of a third circuit configuration, which has a second output port that is connected with the first output port through a logical OR function, wherein the output port of the OR function is connected with the input port of the first circuit configuration. The beneficial feature of this circuit configuration is that more than one bus non-conforming module can be connected to the first communication bus. With the disjunction it is possible to subject the wait signals sent from both the second circuit configuration and the third circuit configuration to an OR operation and to connect the output port of this disjunction to the bridge so that the bridge is in a position to wait for each module that is connected with the first communication bus. The OR function is not limited to two modules; any random number of modules can be subjected to an OR operation with wait signals, with the result of the disjunction being transmitted to the bridge.

Another embodiment of the invented configuration provides for the first circuit configuration and the second circuit configuration to be separate integrated circuits, which are connected by the first communication bus that is arranged on a system board. By utilizing separate integrated circuits it is possible to realize a modular set-up on a system board where any random number of modules can be connected to the first communication bus e.g. through interface circuits.

Another embodiment of the invented configuration incorporates a feature so that the first circuit configuration and the second circuit configuration are arranged in a joint integrated circuit. The implementation of the first integrated circuit (bridge) and the second integrated circuit (interface) on a joint chip enables the most cost effective manufacturing of a circuit that comprises both the bridge and the interface.

With regard to the method, these and other objects of the invention are achieved by a method for operating a data processing device with the following steps:
Making a first circuit configuration available that connects a first communication bus with a second communication bus and that is the bus master of the first communication bus, wherein a second circuit configuration, which has an output port that is connected with an input port of the first circuit configuration, is connected with the communication bus;
generating a wait signal in the second circuit configuration;
transmitting the wait signal from the second circuit configuration to the first circuit configuration;

allowing the first circuit configuration to wait until the second circuit configuration ends the wait signal.

Due to the wait signal, the invented method for operating a circuit configuration enables the connection of modules to the first communication bus, with the modules not being able to provide data to the bridge until an extended waiting period has passed.

A beneficial embodiment of the invented method provides for a third circuit configuration, which is equipped with a second output port that is connected with the first output port through a logical OR function, wherein a wait signal is sent from the output port of the disjunction to the input port of the first circuit configuration as long as one of the circuit configuration transmits a wait signal.

Additional embodiments of the invention are provided in the sub-claims.

BRIEF DESCRIPTION OF THE DRAWINGS

Examples of various embodiments of the invention are shown and explained in the following detailed description of the preferred embodiments considered in conjunction with the drawings, wherein.

DETAILED DESCRIPTION OF THE PREFERRED EMBODIMENTS

Figure 1:
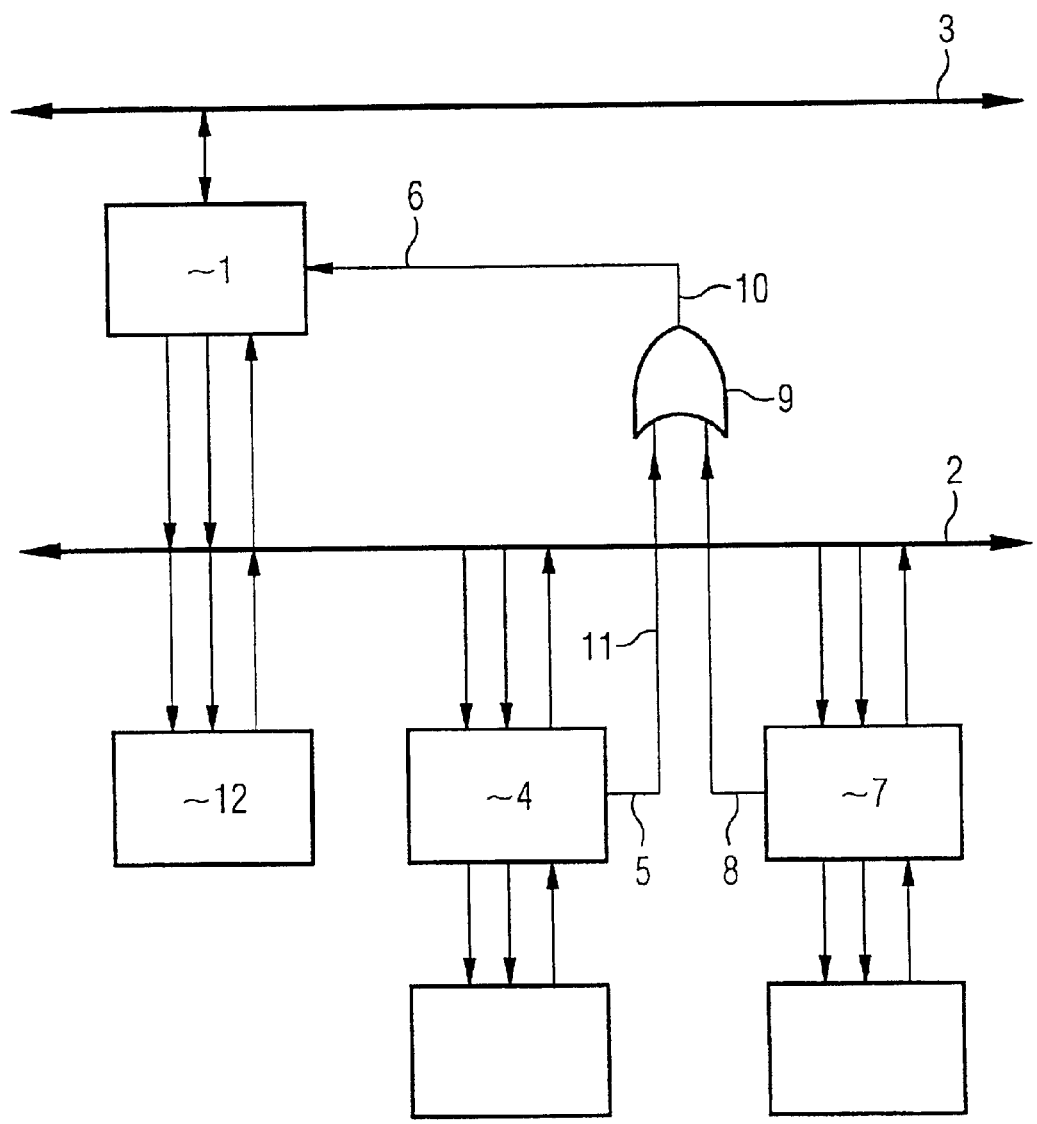
FIG. 1 is a hardware block diagram setting forth the inventive circuit configuration which generates and utilizes a wait signal.

FIG. 1 shows a first circuit configuration 1, which connects a first communication bus 2 with a second communication bus 3. Additionally, a second circuit configuration 4, which is equipped with an output port 5, is connected with the first communication bus 2. Furthermore, a third circuit configuration 7, which is equipped with a second output port 8, is connected to the first communication bus 2. The first output port 5 and the second output port 8 are connected with a logical OR function 9, whose output port 10 is connected with an input port 6 of the first circuit configuration 1. Beyond that, a bus-conforming circuit configuration 12 is connected to the first communication bus 2.

The operating process of the data processing device depicted in FIG. 1 ensures that read and write access from the bridge, which in this example is the first circuit configuration 1, is executed on the first communication bus 2 within two clock pulses. The wait signal 11, which is generated by the second circuit configuration 4 on its first output port 5, is connected with the first circuit configuration 1 over the input port 6 so that the second circuit configuration 4 can extend write access and/or read access of the first circuit configuration 1 through the wait signal 11 to a random number of clock pulses.

Figure 2:
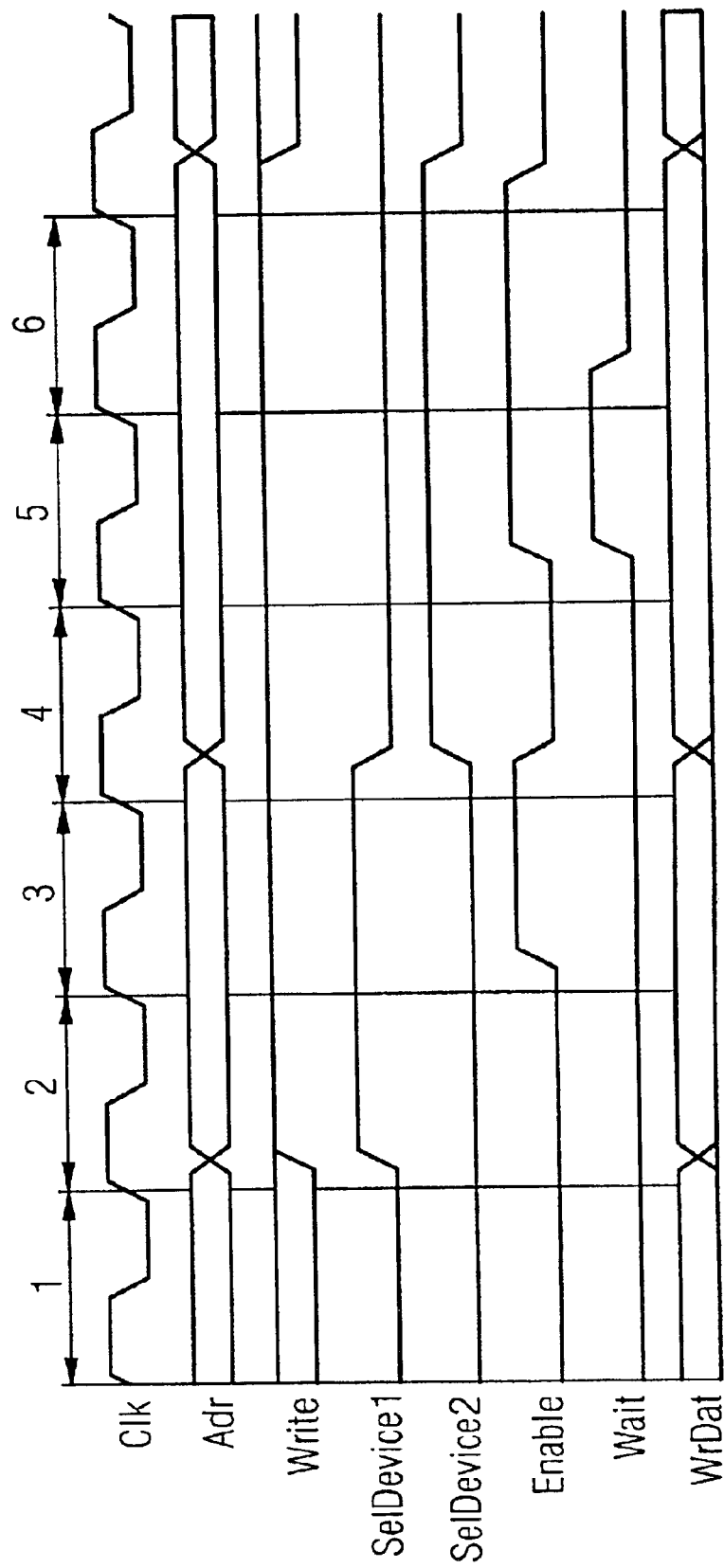
FIG. 2 sets forth a timing diagram for a write process.

FIG. 2 shows a timing diagram for access of the first circuit configuration 1 to the first communication bus 2. In the example, specifically the protocol of the APB bus (revision E, document no. ARM IHI 0009A ARM Company) is shown. In the top line the timing signal CLK (clock) is shown, which has one period within the numbered clocks pulses 1 through 6, respectively. A write process on the first communication bus 2 starts for example in the second clock pulse by creating the address ADR, signaling a write process with the signal WRITE, which is shown by a high level, selecting a first peripheral unit through the line SELDEVICE1 and presenting the data WRDAT. In the third clock pulse, which represents the second clock pulse of the write signal, the signal ENABLE shows the availability of the data. Upon completion of the third clock pulse, the data transmission process is completed. In the fourth through sixth clock pulses a second write process is shown, which differs from the first write process in that in this case a different peripheral unit was selected through the line SELDEVICE2, with the first peripheral unit no longer being selected through the line SELDEVICE1. The write process in this case has been extended to three clock pulses since in the middle clock pulse (pulse 5) a wait signal 11 was transmitted from the second circuit configuration 4 to the first circuit configuration 1 through the line WAIT. The existence of the WAIT signal can expand the appropriate write process to a random number of clock cycles.

Figure 3:
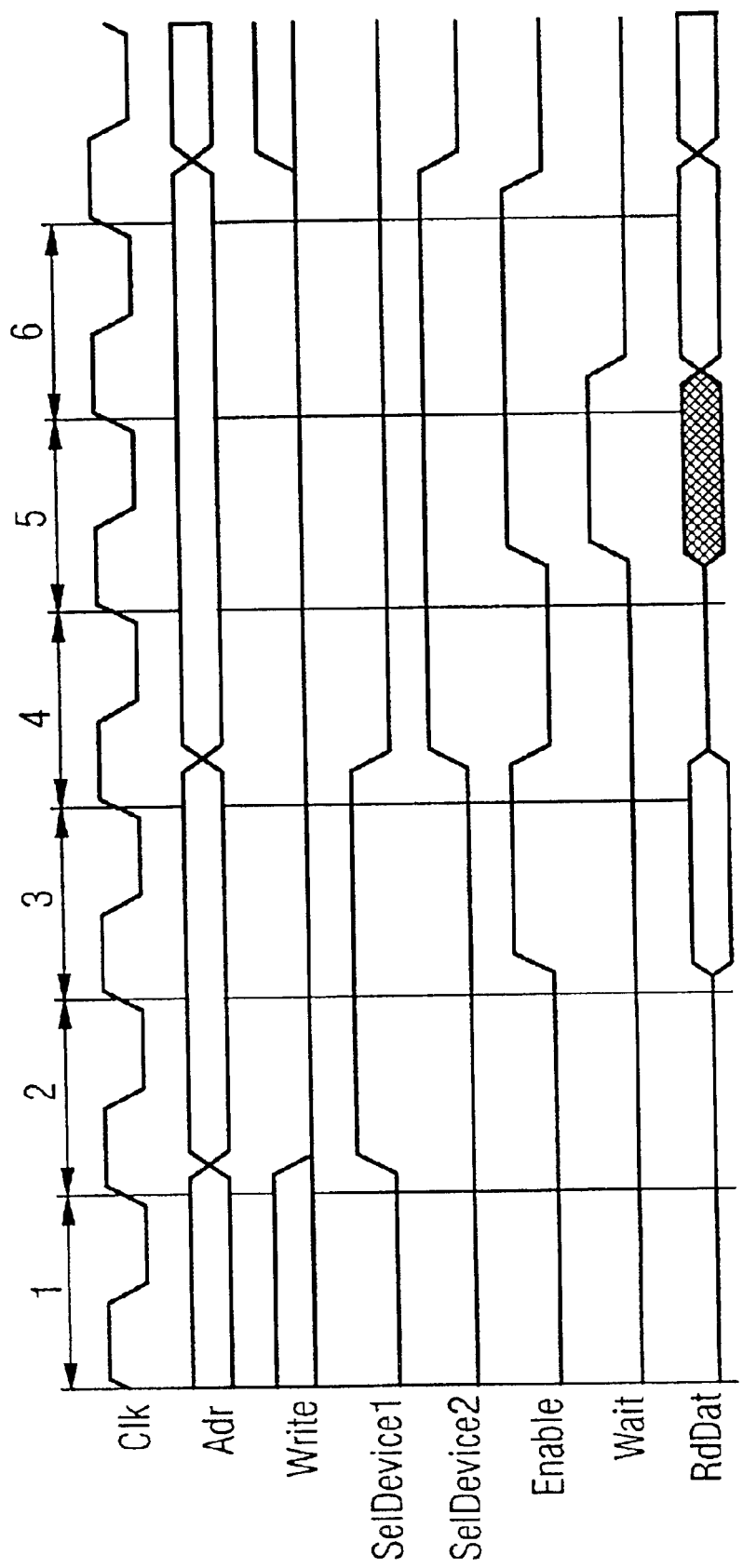
FIG. 3 sets forth a timing diagram for a read process.

With reference to FIG. 3, a read process of the first circuit configuration 1 on the first communication bus 2 is shown. The timing diagram in FIG. 3 differs from the timing diagram in FIG. 2 in the execution of read processes since in the time windows 2 through 6 the signal WRITE is low. The data lines RDDAT in the time window 5 are not valid since at that time the signal WAIT is high and thus a wait signal 11 is transmitted from the second circuit configuration 4 to the first circuit configuration 1 and shows that the second circuit configuration 2 is not ready yet for data transmission

What is claimed is:

1. A data processing device comprising:
    a first circuit configuration (1), which connects a first communication bus (2) with a second communication bus (3) and is the bus master of the first communication bus (2);
    a second circuit configuration (4), which is connected with the first communication bus (2),
    wherein the second circuit configuration is equipped with a first output port (5), which is connected with the input port (6) of the first circuit configuration (1); and
    a third circuit configuration (7), which is equipped with a second output port (8) that is connected with the first output port (5) through a logical OR function (9), wherein output port (10) of the OR function (9) is connected with the input port (6) of the first circuit configuration (1).

2. The data processing device of claim 1, wherein the first circuit configuration (1) and the second circuit configuration (4) are separate integrated circuits, which are connected by the first communication bus (2) that is arranged on a system board.

3. The data processing device of claim 1, characterized in that the first circuit configuration (1) and the second circuit configuration (4) are arranged in a joint integrated circuit.

4. A method for operating a data processing device, the method comprising the steps of:
    (a) providing a first circuit configuration (1) that connects a first communication bus (2) with a second communication bus (3) and that is the bus master of the first communication bus (2), wherein a second circuit configuration (4) is connected with the first communication bus (2) and the second circuit configuration is equipped with an output port (5) that is connected with the input port (6) of the first circuit configuration (1),
    (b) generating a wait signal (11) in the second circuit configuration (4);
    (c) transmitting the wait signal (11) from the second circuit configuration (4) to the first circuit configuration (1);

(d) allowing the first circuit configuration (1) to wait until the second circuit configuration (4) ends the wait signal (11);

the method characterized by:

arranging a third circuit configuration (7) equipped with a second output port (8) that is connected with the first output port (5) through a logical OR function (9), wherein the wait signal (11) is sent from the output port (10) of the OR function (9) to the input port (6) of the first circuit configuration (1) as long as one of the circuit configurations (4,7) transmits a wait signal.

* * * * *